United States Patent [19]
Song et al.

[11] Patent Number: 4,857,313
[45] Date of Patent: Aug. 15, 1989

[54] TRANSDERMAL DRUG DELIVERY DEVICE COMPRISING COPOLYMERS OF N-MORPHOLINOETHYL METHACRYLATE AND 2-HYDROXYLMETHACRYLATE

[75] Inventors: Suk-zu Song, Flanders; Zahra A. Rashidbaigi, Nutley; Russell U. Nesbitt, Somerville; Mahdi B. Fawzi, Flanders, all of N.J.

[73] Assignee: Warner-Lambert Company, Morris Plains, N.J.

[21] Appl. No.: 55,095

[22] Filed: May 28, 1987

[51] Int. Cl.$^4$ .................... C08F 226/06; A61K 31/78
[52] U.S. Cl. ........................... 424/81; 424/449; 526/260; 564/317
[58] Field of Search ............................. 424/81

[56] References Cited

U.S. PATENT DOCUMENTS

| | | | |
|---|---|---|---|
| 2,427,878 | 9/1947 | Rieveschl, Jr. | 564/317 |
| 3,896,753 | 7/1975 | Shepherd et al. | 523/122 |
| 3,966,902 | 6/1976 | Chromecek | 424/59 |
| 4,291,015 | 9/1981 | Keith | 424/486 |
| 4,409,206 | 10/1983 | Stricker | 424/81 |
| 4,587,129 | 5/1986 | Kliment | 523/100 |

*Primary Examiner*—Joseph L. Schofer
*Assistant Examiner*—Peter F. Kulkosky
*Attorney, Agent, or Firm*—Elizabeth M. Anderson

[57] ABSTRACT

The invention concerns a novel copolymer of N-morpholinoethyl methacrylate and 2-hydroxyethyl methacrylate which can be used in transdermal delivery systems or in oral controlled release products. The invention also concerns a process for preparing the copolymer and a method of using it to administer pharmaceutically active substances.

3 Claims, No Drawings

TRANSDERMAL DRUG DELIVERY DEVICE COMPRISING COPOLYMERS OF N-MORPHOLINOETHYL METHACRYLATE AND 2-HYDROXYLMETHACRYLATE

BACKGROUND OF THE INVENTION

Many drugs are capable of penetrating the skin and thereby the general circulatory system where they act systemically. The advantages of administering drugs this way are the elimination of the uncontrollable factors of gastrointestinal absorption, the reduction of the metabolism by avoiding the first liver passage, the avoidance of initial high blood concentrations and attainment of a more constant blood level over a longer period of time.

Various transdermal sustained release systems for are known which use polymers as part of the transdermal device. U.S. Pat. No. 4,409,206 is directed to a pharmaceutical preparation which is a film of a polyacrylate which swells in water and contains an active substance in amorphous form. Useful polyacrylate materials are polymers or copolymers of acrylic acid or methacrylic acid, alkyl esters thereof, and acrylonitrile.

U.S. Pat. No. 4,291,015 covers a polymeric diffusion matrix containing a vasodilator which comprises from 2 to 60% of a polar plasticizer, 2 to 15% of a matrix component such as polyvinylalcohol, and from 2 to 10% of a water-soluble polymer with hydration sites, e.g., polyvinylpyrrolidone.

U.S. Pat. No. 3,966,902 pertains to a polymer complex carrier and an active ingredient entrapped therein. The complex is in part a monomer with a hydrophilic function and contains aluminum, zinc, or zirconium metal bound in complex form.

Polymeric substrates that are soluble in water are not suitable for long-term transdermal application. The present invention provides a novel transdermal release system for both hydrophilic and hydrophobic drugs. The polymer swells but does not dissolve in water. It provides a delivery system which is simple and inexpensive to produce, which ensures a reproducible, controlled release with low temperature-dependence and a constant rate up to a high dose, and also permits variation of the rate of release within wide limits.

These characteristics provide for excellent oral controlled release forms as well.

SUMMARY OF THE INVENTION

The present invention relates to a novel copolymer, N-morpholinoethyl methacrylate and 2-hydroxyethyl methacrylate, of the formula

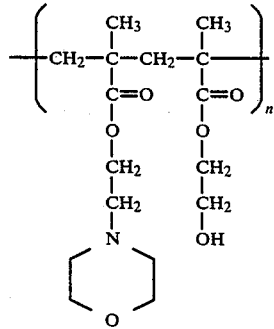

random copolymer wherein n is an integer of from 5 to 10,000.

This copolymer is synthesized from varied amounts of N-morpholinoethyl methacrylate and 2-hydroxyethyl methacrylate The two compounds may be combined in a ratio of from 1:10 to 10:1 respectively. Preferably the ratio is about 1:1. The copolymer is produced by free radical polymerization using any free radical as would occur to one skilled in the art such as azobisisobutyronitrile or benzoyl peroxide in the presence of alcohol such as isopropyl, methanol, ethanol or butanol. Preferably the initiator is azobisisobutyronitrile and the alcohol is ethanol. The copolymer forms a hydrogel which swells but does not dissolve in the presence of water. It is soluble in alcohol.

The present invention also relates to the use of the copolymer as a polymer matrix for novel transdermal drug delivery devices. When combined with liquid formulations containing glycerol or triacetin, the polymer matrix is a pharmaceutical preparation which can deliver drugs to achieve concentrations of therapeutic levels, transdermally, for more than twenty-four hours.

The copolymer also provides oral dosage forms which provide sustained release formulations for both hydrophobic and hydrophilic drugs.

The invention also concerns a method of administering a pharmaceutically active substance to a warm blooded animal in need of such treatment which comprises maintaining the skin of said animal in contact with the pharmaceutical preparation.

This invention also relates to novel formulations of the copolymer.

DETAILED DESCRIPTION OF THE INVENTION

The copolymer of the present invention, shown as above in formula I of the random copolymer, is synthesized by mixing 10% of N-morpholinoethyl methacrylate and 10% of 2-hydroxyethyl methacrylate in alcohol. Initiator is added in the mixture. The amount of initiator can vary from 0.006 to 0.6%; preferably it is 0.06%. The mixture is heated to about 60° C. for about 24 hours. After cooling, an alcohol soluble drug is added as well as other ingredients useful in transdermal delivery systems. The solvent is then evaporated off.

For oral preparations the alcohol is evaporated off and the remaining solid is powderized. The drug and excipients are added in the amounts desired and the mixture is compressed to tablet form by methods known to one skilled in the art.

The hydrogel formed is used in a pharmaceutical preparation which can be used for the application of virtually any pharmaceutical suitable for transdermal administration. Useful pharmaceuticals include but are not limited to the following: antihistaminics, i.e., diphenhydramine; coronary drugs, i.e., nitroglycerin; estrogen; contraceptives; anesthetics, i.e., ketamine; analgesics, i.e., oxymorphone; antirheumatics; anticholinergics; cognition activators; bronchodilators, i.e., procaterol; antihypertensives, i.e., clonidine; and other pharmaceuticals suitable for transdermal administration.

The transdermal device of the instant invention provides a matrix that can deliver pharmaceuticals to achieve concentrations at therapeutic levels for more than twenty-four hours. The device adheres firmly to the skin and yet can easily be removed even after long periods of contact with the skin because of the hydration properties of the hydrogel. Further, the device is biocompatible. The various applications of the device are those as would occur to one skilled in the art.

Since the copolymer is soluble in alcohol and the drug is also alcohol soluble, the mixture of the two is homogeneous and does not produce a segregated mix. Therefore, all of the drug is available to be released in a controlled manner. The amount of the drug available is much higher and the drug loading is homogeneous. This is very advantageous since it allows the amount of drug to be carefully tailored to the need.

Tables I and II below describe several preferred embodiments that illustrate one aspect of the present invention. However, the invention is not limited to these specific embodiments.

TABLE I

Transdermal

| Formulation | | Flux* | Minimum Required Flux* (1) |
|---|---|---|---|
| Copolymer | 1.0 g | 35.7 ± 4.4 | 28.2 |
| Glycerol | 0.8 g | | |
| Decylmethyl Sulfoxide | 0.2 g | | |
| Chlorpheniramine | 0.2 g | | |
| Copolymer | 1.0 g | 33.3 ± 3.8 | 28.2 |
| Glycerol | 0.8 g | | |
| Linoleic Acid | 0.2 g | | |
| Chlorpheniramine | 0.2 g | | |
| Copolymer | 1.0 g | 33.0 ± 1.4 | 28.2 |
| Triacetin | 0.5 g | | |
| Propylene Glycol | 0.3 g | | |
| Linoleic Acid | 0.2 g | | |
| Chlorpheniramine | 0.2 g | | |

*mg/10 cm$^2$/day

TABLE II

Oral

| Formulation | |
|---|---|
| Copolymer | 3 g |
| 4,5-Dihydro-6-[4-(1H—imidazol-1-yl)phenyl]-5-methyl-3(2H)—pyridazinone, HCl | 1.8 g |
| Ca stearate | 0.144 g |

The formulation in Table II above was prepared from a copolymer of N-morpholinoethyl methacrylate and 2-hydroxyethyl methacrylate (HEMA) which was dried and pulverized to fine powder. The copolymer powder, a drug, and a lubricant (Ca stearate) were mixed homogeneously.

The mixture was punched into minitablets using single station compression machine (Stokes Tablet Machine, Model E).

| Weights of Minitablets | |
|---|---|
| (a) | 43.78 mg |
| (b) | 44.21 mg |
| (c) | 42.63 mg |
| Average: 43.54 ± 0.82 mg | |

| Time (hr) | Amoung of Drug Released (mg) | Percent Drug Released (%) |
|---|---|---|
| 0.5 | 1.80 ± 0.24 | 11.3 ± 1.5 |
| 1.0 | 2.67 ± 0.27 | 16.9 ± 1.7 |
| 2.0 | 4.50 ± 0.48 | 28.4 ± 3.0 |
| 4.0 | 5.99 ± 0.38 | 37.8 ± 2.4 |
| 6.0 | 8.07 ± 0.57 | 50.9 ± 3.0 |
| 8.0 | 10.27 ± 0.68 | 64.8 ± 4.3 |
| 10.0 | 11.89 ± 0.79 | 75.0 ± 4.9 |
| 12.0 | 13.02 ± 0.95 | 82.2 ± 6.0 |

We claim:
1. A pharmaceutical preparation for transdermal application comprising
(a) a copolymer having the formula

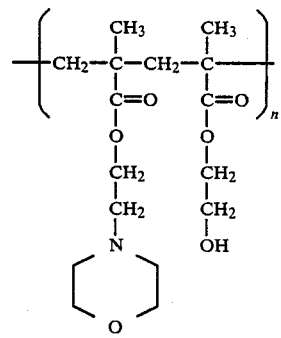

wherein n is an integer from 5 to 10,000 which copolymer is prepared by mixing N-morpholinoethyl methacrylate and 2-hydroxyl methacrylate with a free radical initiator in the presence of alcohol,
(b) glycerol or triacetin, and
(c) diphenhydramine hydrochloride.

2. An oral dosage form comprising (a) copolymer having the formula

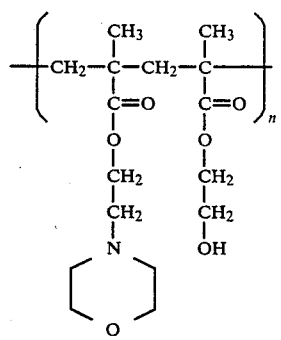

wherein n is an integer of from 5 to 10,000 which copolymer is prepared by mixing N-morpholinoethyl methacrylate and 2-hydroxyethyl methacrylate with a free radical initiator in the presence of alcohol,
(b) an effective amount of diphenhydramine hydrochloride, and
(c) a pharmaceutically acceptable excipient.

3. A method of administering a pharmaceutically active substance to a warm-blooded animal which comprises maintaining the skin of said animal in contact with the pharmaceutical preparation of claim 1.

* * * * *

UNITED STATES PATENT AND TRADEMARK OFFICE
CERTIFICATE OF CORRECTION

PATENT NO. : 4,857,313
DATED : August 15, 1989
INVENTOR(S) : Song et al

It is certified that error appears in the above—identified patent and that said Letters Patent is hereby corrected as shown below:

Column 4, line 34, delete "2-hydroxyl" and insert -- 2-hydroxyethyl --.

In the title, delete "2-HYDROXYLMETHACRYLATE" and insert -- 2-HYDROXYETHYL METHACRYLATE --.

Signed and Sealed this

Nineteenth Day of June, 1990

Attest:

HARRY F. MANBECK, JR.

Attesting Officer

Commissioner of Patents and Trademarks